(12) United States Patent
Yuan et al.

(10) Patent No.: US 9,961,281 B2
(45) Date of Patent: May 1, 2018

(54) IMAGE SENSOR PIXEL NOISE MEASUREMENT

(71) Applicant: OMNIVISION TECHNOLOGIES, INC., Santa Clara, CA (US)

(72) Inventors: Bi Yuan, San Jose, CA (US); Liping Deng, Cupertino, CA (US); Yingkan Lin, San Jose, CA (US); Liang Zuo, San Jose, CA (US); Yuxin Wang, Sunnyvale, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days. days.

(21) Appl. No.: 15/179,648

(22) Filed: Jun. 10, 2016

(65) Prior Publication Data

US 2017/0359532 A1 Dec. 14, 2017

(51) Int. Cl.
*H04N 5/357* (2011.01)
*H04N 5/378* (2011.01)

(52) U.S. Cl.
CPC ............. *H04N 5/357* (2013.01); *H04N 5/378* (2013.01)

(58) Field of Classification Search
CPC .............................. H04N 5/357; H04N 5/378
See application file for complete search history.

(56) References Cited

U.S. PATENT DOCUMENTS

2006/0097806 A1* 5/2006 Burdo .................... H03B 29/00
   331/78
2006/0176401 A1* 8/2006 Turchetta ........... H04N 5/35545
   348/571
2011/0050970 A1* 3/2011 Ozawa ................. H04N 5/3722
   348/311
2012/0085822 A1* 4/2012 Setlak .................... G06K 9/605
   235/439
2013/0293704 A1* 11/2013 Imamura .................. G01C 3/08
   348/135
2014/0022363 A1* 1/2014 Gilton .................. G01N 21/253
   348/61

OTHER PUBLICATIONS

Tian, H., "Noise Analysis in CMOS Image Sensors: A Dissertation Submitted to the Dept. of Applied Physics and the Committee on Graduate Studies of Stanford University", Aug. 2010, 114 pages. Retrieved from: http://www-isl.stanford.edu/~abbas/group/papers_and_pub/hui_thesis.pdf.

* cited by examiner

*Primary Examiner* — Gevell Selby
(74) *Attorney, Agent, or Firm* — Christensen O'Connor; Johnson Kindness PLLC (57) ABSTRACT

An image sensor pixel noise measurement circuit includes a pixel array on an integrated circuit chip. The pixel array includes a plurality of pixels including a first pixel to output a first image data signal, and a second pixel to output a second image data signal. A noise amplification circuit on the integrated circuit chip is coupled to receive the first and second image data signals from the pixel array. The noise amplification circuit is coupled to output an amplified differential noise signal in response to the first and second image data signals received from the pixel array. A fast Fourier transform (FFT) analysis circuit on the integrated circuit chip is coupled to transform the amplified differential noise signal output by the noise amplification circuit from a time domain to a frequency domain to analyze a pixel noise characteristic of the pixel array.

15 Claims, 4 Drawing Sheets

IMAGE SENSOR PIXEL NOISE MEASUREMENT

BACKGROUND INFORMATION

Field of the Disclosure

The present invention relates generally to image sensors. More specifically, examples of the present invention are related to techniques to obtain and output image sensor pixel noise characteristics.

Background

Image sensors have become ubiquitous. They are widely used in digital still cameras, video cameras, cellular phones, security cameras, as well as, medical, automobile, and a variety of other applications. The technology used to manufacture image sensors has continued to advance at a great pace. For example, the demands of higher resolution and lower power consumption have encouraged the further miniaturization and integration of these devices. As with many semiconductor-based devices, such as image sensors, noise is a concern for device performance and reliability. In a complementary metal oxide semiconductor (CMOS) image sensor, temporal noise sets the fundamental limit on image sensor performance. Temporal noise is typically due to photodetector shot noise and APS (active pixel sensor) noise. APS noise may include for example pixel reset noise, photodetector shot noise, column amplifier transistor thermal and 1/f noise. Under low light conditions, the dominant noise sources may include pixel reset noise, follower noise and readout circuit noise. Under bright conditions, the dominant noise source may typically include photodiode shot noise.

Analysis of the image sensor pixel noise has typically been performed using traditional frequency-domain and time-domain analysis techniques. One of the challenges of analyzing image sensor pixels is that image sensor noise data has traditionally been difficult to acquire reliably, making it difficult to verify the results. Because image sensor pixel noise values are usually very small (e.g., on the order of only about several tens of microvolts to several hundreds of microvolts), typical measuring instruments are unable support such a small scale. Further exasperating the problem is that pixel outputs are load sensitive, and consequently when the pixel outputs are directly connected to noise measuring instruments, the noise bandwidth of the pixel outputs are impacted significantly.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

As will be shown, methods and apparatuses directed to measuring image sensor pixel noise are disclosed. In the following description, numerous specific details are set forth in order to provide a thorough understanding of the present invention. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," an embodiment, "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. The following is a detailed description of the terms and elements used in the description of examples of the present invention by referring to the accompanying drawings.

As will be discussed, examples of image sensor pixel noise measurement circuits are described in detail below. In various examples, image sensor pixel noise measurement circuits in accordance with the teachings of the present invention obtain and output APS noise to measurement instruments in real time. In the examples, the pixel output is directly connected to an example high-fidelity measurement system, where the pixel noise is amplified in continuous time for display on the measurement instrument through sampling and fast Fourier transform (FFT) analysis, to provide APS noise characteristics. In the examples, the image sensor pixel noise measurement circuits are on the same integrated circuit chip as the pixel array instead of being on another separate testing board. In one example, an image sensor pixel noise measurement circuit in accordance with the teachings of the present invention includes a three-stage, low noise, high gain amplifier. For instance, as will be discussed, in one example, the input noise information that is received by the high gain amplifier of the measurement circuit is on the order 7 uV, and the gain of the high gain amplifier of the image sensor pixel noise measurement circuit may be up to 4000 times. In the various examples, the high gain amplifier of the image sensor pixel noise measurement circuits also features low input loading, which ensures that the pixel output bandwidth matches normal working conditions for increased accuracy of noise measurements in accordance with the teachings of the present invention.

Figure 1:
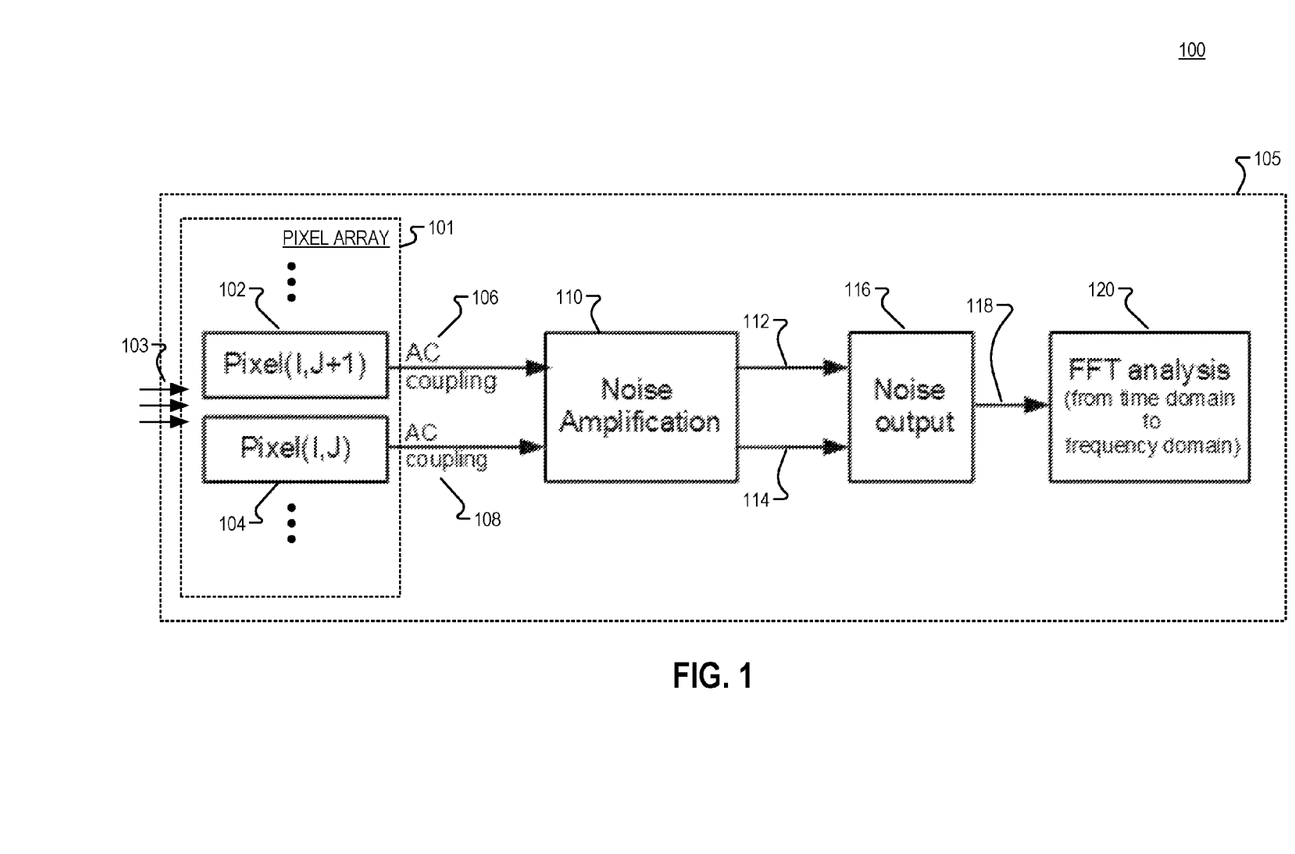
FIG. 1 is a block diagram illustrating one example of an image sensor pixel noise measurement circuit in accordance with the teachings of the present invention.

To illustrate, FIG. 1 is a block diagram illustrating one example of an image sensor pixel noise measurement circuit 100 in accordance with the teachings of the present invention. As shown in the depicted example, a pixel array 101 is included on an integrated circuit chip 105, and includes a plurality of pixels including a first pixel 102 and a second pixel 104. During normal operation, the pixels of pixel array 101 are coupled to output image data signals in response to incident light 103, which are output to readout circuitry of an imaging system (not illustrated) to acquire an image from pixel array 101. As such, first pixel 102 is coupled to output a first image data signal, and the second pixel 104 is coupled to output a second image data signal in response to incident light 103. The first and second image data signals also include noise information from the first and second pixels 102 and 104. In one example, the first and second pixels 102 and 104 are adjacent pixels in the pixel array 101. Accordingly, in one example, the first and second pixels 102 and 104 are two adjacent column pixels of pixel array 101, and also act as two differential inputs to the amplification circuitry of image sensor pixel noise measurement circuit 100 in accordance with the teachings of the present invention.

In particular, as shown in the example depicted in FIG. 1, image sensor pixel noise measurement circuit 100 also includes a noise amplification circuit 110 on the integrated circuit chip 105, which is coupled to receive the noise information included in the first and second image data signals from the first and second pixels 102 and 104, respectively, of pixel array 105. In one example, the noise amplification circuit 110 is coupled to receive the first image data signal from the first pixel 102 through a first AC coupling 106, and the second image data signal from the second pixel 104 through a second AC coupling 108 as shown. As such, the DC voltage components of the pixel output voltages from the first and second pixels 102 and 104 are eliminated through the AC couplings 106 and 108, while the noise information contained in the first and second image data signals from the first and second pixels 102 and 104 is preserved and passed along to the amplification stage for later processing and analysis in accordance with the teachings of the present invention.

In the example, the noise amplification circuit 110 is coupled to output an amplified differential noise signal in response to the first and second image data signals received from the first and second pixels 102 and 104. In the depicted example, the amplified differential noise signal output from noise amplification circuit 110 is a differential output signal including a first noise signal 112 and a second noise signal 114 as shown. In one example, first and second noise signals 112 and 114 may be a complementary pair of differential signals, and therefore provide the benefit of good a common mode rejection ratio (CMRR) and power supply rejection ratio (PSRR), which can greatly prevent disturbances that can originate from the power supply and ground due to timing switches, or other sources interference. Accordingly, it is appreciated that the need for an additional high quality power supply for testing circuitry purposes is not required since the image sensor pixel noise measurement circuit 100 is able to use the same power supply used to provide power to the pixel array 101 by using the fully differential structure in accordance with the teachings of the present invention.

A fast Fourier transform (FFT) analysis circuit 120 is also included on the integrated circuit chip 105 is coupled to transform the amplified differential noise signal, which includes first and second noise signals 112 and 114, from the time domain to the frequency domain to analyze a pixel noise characteristic of the pixel array in accordance with the teachings of the present invention. In one example, a noise output circuit 116 may also be included on the integrated circuit chip 105, and is coupled between the noise amplification circuit 110 and the FFT analysis circuit 120 as shown. In one example, the noise output circuit 110 is coupled to receive the amplified differential noise signal from the noise amplification circuit 110, and is coupled to output a single-ended amplified noise signal 118 to the FFT analysis circuit 120 as shown.

Figure 2:
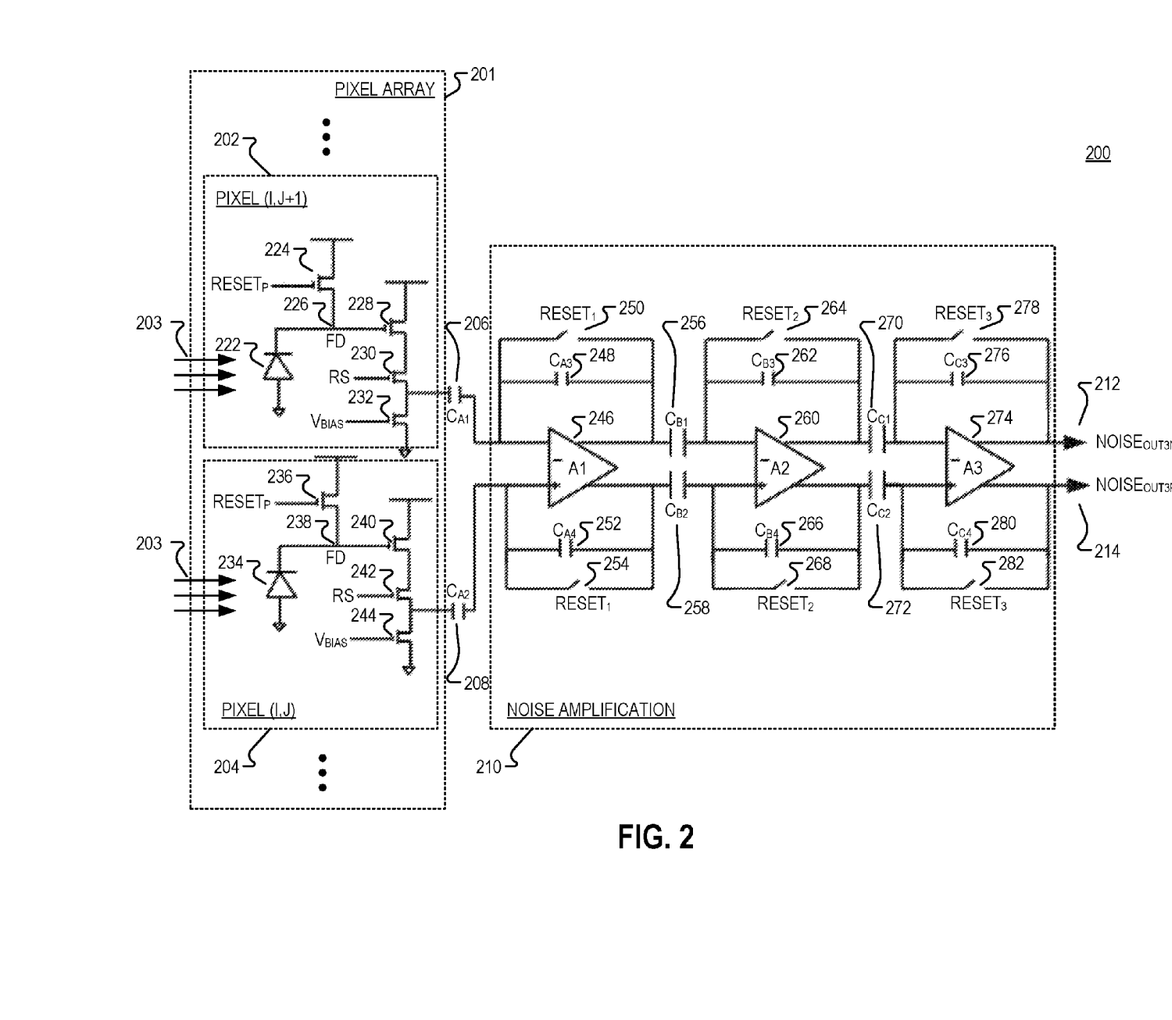
FIG. 2 is a schematic illustrating a detailed example of an image sensor pixel noise measurement circuit in accordance with the teachings of the present invention.

FIG. 2 is a schematic illustrating increased detail of example of an image sensor pixel noise measurement circuit 200 in accordance with the teachings of the present invention. In the depicted example, it is appreciated that image sensor pixel noise measurement circuit 200 of FIG. 2 may be one of example of image sensor pixel noise measurement circuit 100 of FIG. 1, and that similarly named and numbered elements referenced below are coupled and function similar to as described above.

As shown in the depicted example, a pixel array 201 includes a plurality of pixels, which include a first pixel 202 and a second pixel 204. During normal operation, first pixel 202 is coupled to output a first image data signal, and the second pixel 204 is coupled to output a second image data signal in response to incident light 203. In one example, the first and second pixels 202 and 204 are adjacent pixels in the pixel array 201. Accordingly, in the example depicted in FIG. 2, first and second pixels 202 and 204 are also labeled "PIXEL (I, J+1)" and "PIXEL (I, J)," and are therefore two adjacent column pixels of pixel array 201. Noise information is also included in the first and second image data signals output from first and second pixels 202 and 204. As such, first and second pixels 202 and 204 also act as the noise test source including two differential inputs to the amplification circuitry of image sensor pixel noise measurement circuit 200 in accordance with the teachings of the present invention. With first and second pixels 202 and 204 having the same circuit structures, transistor sizes, power, ground, and control signals, the first and second pixels 202 and 204 serve as the pseudo differential inputs in accordance with the teachings of the present invention.

In the example illustrated in FIG. 2, first pixel 202 includes a photodiode 222 coupled to photogenerate image charge. A floating diffusion (FD) node 226 is coupled to receive the image charge photogenerated in photodiode 222. A reset transistor 224 is coupled to reset the photodiode 222 and floating diffusion node FD 226 during a reset pixel phase of the first pixel 202 that is activated and deactivated in response to a reset signal $RESET_P$. A gate terminal of a source follower coupled amplifier transistor 228 is coupled to the floating diffusion node FD 226. During operation, the amplifier transistor 228 is coupled to convert and amplify the charge information in the floating diffusion node FD 226 to a voltage signal containing output image data for first pixel 202. A row select transistor 230 is coupled between amplifier transistor 228 and an output column bitline to output the image data in response to a row select signal RS to the output column bitline, which is coupled to a bias transistor 232 that is biased with a $V_{BIAS}$ signal. As such, first pixel 202 is coupled to output a first image data signal from the row select transistor 230 to an AC coupling, which is illustrated in the example of FIG. 2 with a first AC coupling capacitor $C_{A1}$ 206.

In the example, second pixel 204 shares many similarities with first pixel 202. For instance, second pixel 204 includes a photodiode 234 coupled to photogenerate image charge. A floating diffusion (FD) node 238 is coupled to receive the image charge photogenerated in photodiode 234. A reset transistor 236 is coupled to reset the photodiode 234 and floating diffusion node FD 238 during a reset pixel phase of the second pixel 204 that is also activated and deactivated in response to the reset signal $RESET_P$. A gate terminal of a source follower coupled amplifier transistor 240 is coupled to the floating diffusion node FD 238. During operation, the amplifier transistor 240 is coupled to convert and amplify the charge information in the floating diffusion node FD 238 to a voltage signal containing output image data for second pixel 204. A row select transistor 242 is coupled between amplifier transistor 240 and an output column bitline to output the image data in response to a row select signal RS to the output column bitline, which is coupled to a bias transistor 244 that is biased with a $V_{BIAS}$ signal. As such, second pixel 204 is coupled to output a second image data signal from the row select transistor 242 to an AC coupling, which is illustrated in the example of FIG. 2 with a second AC coupling capacitor $C_{A2}$ 208.

In the example depicted in FIG. 2, the image sensor pixel noise measurement circuit 200 also includes a noise amplification circuit 210, which is coupled to receive the first and second image data signals from the first and second pixels 202 and 204, respectively, through first AC coupling capacitor $C_{A1}$ 206 and second AC coupling capacitor $C_{A2}$ 208 as shown. As such, the DC voltage components of the pixel outputs from the first and second pixels 202 and 204 are eliminated through the AC coupling capacitors $C_{A1}$ 206 and $C_{A2}$ 208, while the noise information contained in the first and second image data signals is preserved and passed along to the amplification stage.

As shown in the depicted example, the noise amplification circuit 210 is coupled to receive the noise information contained in the first and second image data signals from the first and second pixels 202 and 204 through the AC coupling capacitors $C_{A1}$ 206 and $C_{A2}$ 208 to output an amplified differential noise signal. In the depicted example, the amplified differential noise signal output from noise amplification circuit 210 is a differential output signal including a first noise signal 212 and a second noise signal 214 as shown, which are also labeled $NOISE_{OUT3N}$ and $NOISE_{OUT3P}$. In one example, first and second noise signals 212 and 214 may be a complementary pair of differential signals, and therefore provide the benefit of good a common mode rejection ratio (CMRR) and power supply rejection ratio (PSRR), which can greatly prevent disturbances that may originate from the power supply and ground due to timing switches, or other sources interference.

As shown in the depicted example, noise amplification circuit 210 is a multistage differential amplification circuit. For instance, in the example depicted in FIG. 2, noise amplification circuit 210 includes a plurality of operational amplifiers, which are shown as first operational amplifier A1 246, second operational amplifier A2 260, and third operational amplifier A3 274 cascaded in series to generate the amplified differential noise signal, which includes first noise signal 212 and second noise signal 214. In one example, a noise output circuit and a FFT analysis circuit, such as for example the noise output circuit 116 and the FFT analysis circuit 120 illustrated above in FIG. 1, are coupled to transform the amplified differential noise signal provided by first and second noise signals 212 and 214 from the time domain to the frequency domain to analyze a pixel noise characteristic of the pixel array in accordance with the teachings of the present invention.

In the example illustrated in FIG. 2, the first operational amplifier A1 246 includes a first input, which is illustrated as an inverting input, which is directly coupled to receive the first image data signal from the first pixel 202 through first AC coupling capacitor $C_{A1}$ 206. The first operational amplifier A1 246 also includes a second input, which is illustrated as a non-inverting input, which is directly coupled to receive the second image data signal from the second pixel 204 through second AC coupling capacitor $C_{A2}$ 208.

The second operational amplifier A2 260 includes a first input, which is illustrated as an inverting input, which is coupled to receive a first noise output signal from a first output of the first operational amplifier A1 246 through a third AC coupling capacitor $C_{B1}$ 256. The second operational amplifier also includes a second input, which is illustrated as a non-inverting input, which is coupled to receive a second noise output signal from a second output of the first operational amplifier A1 246 through a fourth AC coupling capacitor $C_{B2}$ 258.

The third operational amplifier A3 274 includes a first input, which is illustrated as an inverting input, which is coupled to receive a first noise output signal from a first output of the second operational amplifier A2 260 through a fifth AC coupling capacitor $C_{C1}$ 270. The second operational amplifier also includes a second input, which is illustrated as a non-inverting input, which coupled to receive a second noise output signal from a second output of the second operational amplifier A2 260 through a sixth AC coupling capacitor, $C_{C2}$ 272. The third operational amplifier A3 274 is coupled to output first and second noise signals 212 and 214 to provide the amplified differential noise signal.

Continuing with the example depicted in FIG. 2, a first reset switch 250 is coupled between the first input and the first output of the first operational amplifier A1 246. A first capacitor $C_{A3}$ 248 is also coupled between the first input and the first output of the first operational amplifier 246. A second reset switch 254 is coupled between the second input and the second output of the first operational amplifier A1 246. A second capacitor $C_{A4}$ 252 is also coupled between the second input and the second output of the first operational amplifier A1 246.

A third reset switch 264 is coupled between the first input and the first output of the second operational amplifier A2 260. A third capacitor $C_{B3}$ 262 is also coupled between the first input and the first output of the second operational amplifier A2 260. A fourth reset switch 268 is coupled between the second input and the second output of the second operational amplifier A2 260. A fourth capacitor $C_{B4}$ 266 is also coupled between the second input and the second output of the second operational amplifier A2 260.

A fifth reset switch 278 is coupled between the first input and the first output of the third operational amplifier A3 274. A fifth capacitor $C_{C3}$ 276 is also coupled between the first input and the first output of the third operational amplifier A3 274. A sixth reset switch 282 coupled between the second input and the second output of third operational amplifier A3 274. A sixth capacitor $C_{C4}$ 280 is coupled between the second input and the second output of the third operational amplifier A3 274.

A first reset signal $RESET_1$ is coupled to control the first and second reset switches 250 and 254 to activate and deactivate a reset opamp phase of first operational amplifier A1 246. A second reset signal RESET$_2$ is coupled to control third and fourth reset switches 264 and 268 to activate and deactivate a reset opamp phase of second operational amplifier A2 260. A third reset signal RESET$_3$ is coupled to control fifth and sixth reset switches 278 and 282 to activate and deactivate a reset opamp phase of third operational amplifier A3 274.

As will be discussed in more detail below, during operation, each one of the plurality of operational amplifiers A1 246, A2 260, and A3 274 are coupled to be in the reset opamp phases in response to reset signals RESET$_1$, RESET$_2$, and RESET$_3$ contemporaneously with the first and second pixels 202 and 204 being coupled in the reset pixel phases in response to reset signal RESET$_P$. During the reset pixel phases, the floating diffusions and the photodiodes of first and second pixels 202 and 204 are reset. During the reset opamp phases, the plurality of operational amplifiers A1 246, A2 260, and A3 274 are all connected as unity gain buffers to set up the DC operation point at the respective input nodes. In addition, during the reset opamp phases, the offsets of the first and second outputs of the first operational amplifier A1 246 are sampled to third and fourth AC coupling capacitors $C_{B1}$ 256 and $C_{B2}$ 258, and the offsets of the first and second outputs of the second operational amplifier A2 260 are sampled to fifth and sixth AC coupling capacitors $C_{C1}$ 270 and $C_{C2}$ 272.

After respective reset pixel phases of the first and second pixels 202 and 204 are deactivated in response to reset signal RESET$_P$, charge injection from the photodiodes 222 and 234 causes the floating diffusion FD node voltages to drop, while the plurality of operational amplifiers A1 246, A2 260, and A3 274 are still in their respective reset opamp phases. In one example, after approximately a half cycle after the reset pixel phases of the first and second pixels 202 and 204 are deactivated, the reset opamp phases of the plurality of operational amplifiers A1 246, A2 260, and A3 274 are coupled to be separately and sequentially deactivated in response to reset signals RESET$_1$, RESET$_2$, and RESET$_3$ being deactivated sequentially. In other words, after about a half cycle after the voltages at the floating diffusion FD nodes 226 and 238 are settled after the reset pixel phases are deactivated, the RESET$_1$, RESET$_2$, and RESET$_3$ signals deactivate the reset opamp phases of the plurality of operational amplifiers A1 246, A2 260, and A3 274 one by one with a small timing gap between each other to reduce charge injection effect.

In one example, as the reset opamp phases of the plurality of operational amplifiers A1 246, A2 260, and A3 274 are deactivated one by one, the three stage amplifiers generate a programmable close loop gain from 1000 to 4000 times within a noise bandwidth of interest. The gain G provided by the plurality of operational amplifiers A1 246, A2 260, and A3 274 when the reset opamp phases are deactivated may be determined according to Equation 1:

$$G = \frac{C_{A3} \times C_{B3} \times C_{C3}}{C_{A1} \times C_{B1} \times C_{C1}}, \quad (1)$$

which in other words is equal a product of capacitance values of the first, third, and fifth capacitors $C_{A3}$ 248, $C_{B3}$ 262, and $C_{C3}$ 276, divided by a product of capacitance values of the first, third, and fifth AC coupling capacitors $C_{A1}$ 206, $C_{B1}$ 256, and $C_{C1}$ 270. Therefore, it is appreciated that amplifier gain G may be programmable by selecting appropriate capacitor values for the first, third, and fifth capacitors $C_{A3}$ 248, $C_{B3}$ 262, and $C_{C3}$ 276, the first, third, and fifth AC coupling capacitors $C_{A1}$ 206, $C_{B1}$ 256, and $C_{C1}$ 270, which provides additional versatility and flexibility for an image sensor pixel noise measurement circuit in accordance with the teachings of the present invention to accommodate most circumstances. In addition, in one example, by adjusting the reset timing, noise data may be collected continuously every 1 ms, which translates to a noise frequency lower limit of 1 KHz. It is also appreciated that the lower frequency noise is negligible, as the noise may be canceled by using correlated double sampling (CDS) in the image sensor.

Figure 3:
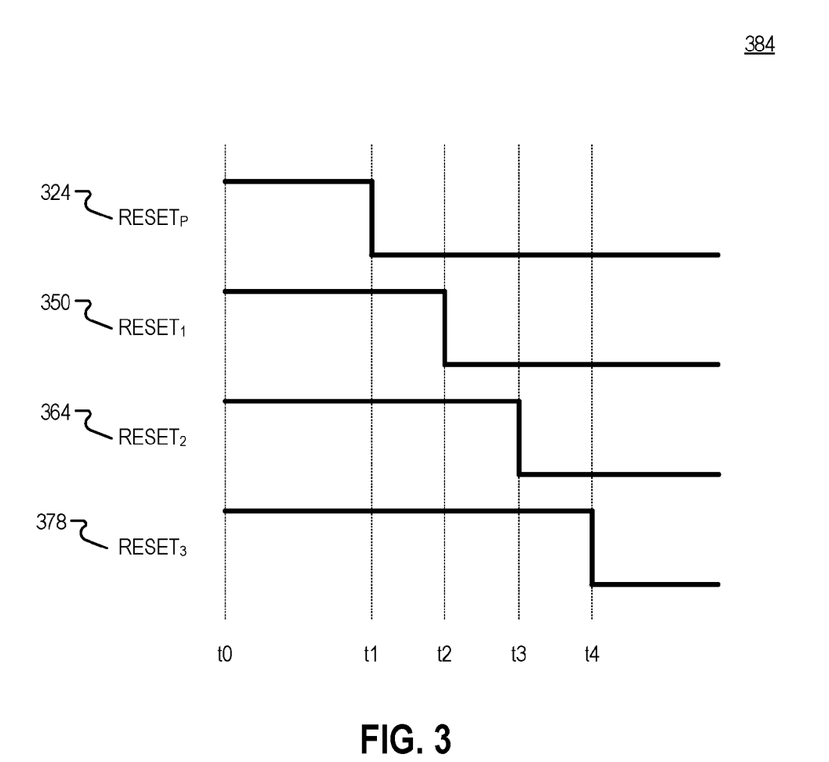
FIG. 3 is a timing diagram illustrating an example of some of the signals in an image sensor pixel noise measurement circuit in accordance with the teachings of the present invention.

FIG. 3 is a timing diagram 384 illustrating an example of some of the signals in an image sensor pixel noise measurement circuit in accordance with the teachings of the present invention. In the depicted example, it is appreciated that signals discussed may correspond with image sensor pixel noise measurement circuit 200 of FIG. 2 or image sensor pixel noise measurement circuit 100 of FIG. 1, and that similarly named and numbered elements referenced below are coupled and function similar to as described above.

In particular, timing diagram 384 of FIG. 3 illustrates a RESET$_P$ 324 signal, a RESET$_1$ 350 signal, a RESET$_2$ 364 signal, and a RESET$_3$ 378 signal, which may correspond with the RESETP signal, and the RESET1, RESET2, and RESET3 signals of FIG. 2. Accordingly, RESET$_P$ 324 may be used to activate and deactivate the reset pixel phases of first and second pixels 202 and 204 of FIG. 2. Similarly, the RESET$_1$ 350, RESET$_2$ 364, and RESET$_3$ 378 signals may be used to activate and deactivate the reset opamp phases of the plurality of operational amplifiers A1 246, A2 260, and A3 274 of FIG. 2.

Referring back to FIG. 3, at time t0, each one of the RESET$_1$ 350, RESET$_2$ 364, and RESET$_3$ 378 signals is coupled to activate the reset opamp phases in the plurality of operational amplifiers A1 246, A2 260, and A3 274 contemporaneously with the RESET$_P$ 324 signal activating the reset pixel phase in the first and second pixels 202 and 204. As discussed above, at this time during the contemporaneous activated reset pixel phases and the reset opamp phases, the floating diffusions and the photodiodes of first and second pixels 202 and 204 are reset, and the plurality of operational amplifiers A1 246, A2 260, and A3 274 are all connected as unity gain buffers to set up the DC operation point at the respective input nodes. In addition, during the reset opamp phases, the offsets of the first and second outputs of the first operational amplifier A1 246 are sampled to third and fourth AC coupling capacitors $C_{B1}$ 256 and $C_{B2}$ 258, and the offsets of the first and second outputs of the second operational amplifier A2 260 are sampled to fifth and sixth AC coupling capacitors $C_{C1}$ 270 and $C_{C2}$ 272.

At time t1, the RESET$_P$ 350 signal deactivates the reset pixel phases, at which time the charge injection from the photodiodes cause the voltages at the floating diffusion FD nodes 226 and 238 to drop, while the plurality of operational amplifiers A1 246, A2 260, and A3 274 the still in the reset opamp phases in response to the RESET$_1$ 350, RESET$_2$ 364, and RESET$_3$ 378 signals still being active.

At time t2, which in one example may be about a half cycle after the voltages at the floating diffusion FD nodes 226 and 238 have settled after the reset pixel phases have been deactivated in response to RESET$_P$ 350 signal being deactivated previously at time t1, the RESET$_1$ 350, RESET$_2$ 364, and RESET$_3$ 378 signals begin deactivating the reset opamp phases of the plurality of operational amplifiers A1 246, A2 260, and A3 274 one by one with a small timing gap between each other to reduce charge injection effect.

Accordingly, at time t2, RESET₁ 350 deactivates the reset opamp phase of operational amplifier A1 246. After a small timing gap, at time t3, RESET₂ 364 deactivates the reset opamp phase of operational amplifier A2 260. After another small timing gap, at time t4, RESET₃ 378 deactivates the reset opamp phase of operational amplifier A3 274. Accordingly, with the plurality of operational amplifiers A1 246, A2 260, and A3 274 are being deactivated one by one, the three stage amplifiers generate a programmable close loop gain, which in one example may be from 1000 to 4000 times, within the noise bandwidth of interest in accordance with the teachings of the present invention.

Figure 4:
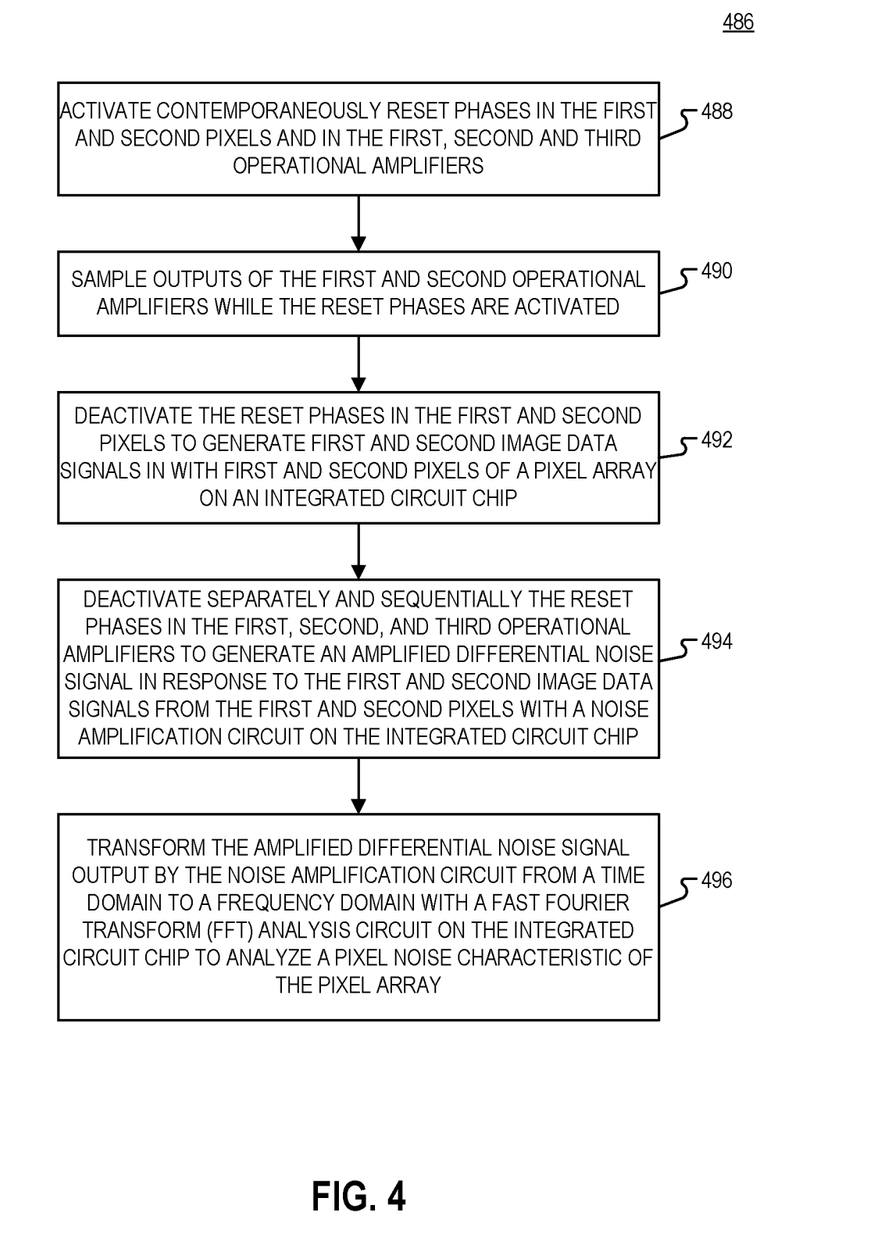
FIG. 4 is a flow chart illustrating one example of process for measuring image sensor pixel noise in accordance with the teachings of the present invention.

FIG. 4 is a flow chart illustrating one example of process 486 for measuring image sensor pixel noise with an image sensor pixel noise measurement circuit in accordance with the teachings of the present invention. In the depicted example, it is appreciated that the process discussed may correspond with the signals described in FIG. 3, or the image sensor pixel noise measurement circuit 200 of FIG. 2 or image sensor pixel noise measurement circuit 100 of FIG. 1, and that similarly named and numbered elements referenced below are coupled and function similar to as described above.

As shown in process block 488, the reset phases in the first and second pixels and in the first, second and third operational amplifiers are contemporaneously activated. At this time, the floating diffusions and the photodiodes of the pixels are reset, and the operational amplifiers are all connected as unity gain buffers to set up the DC operation point at the respective input nodes. Accordingly, process block 490 shows that the outputs of the first and second operational amplifiers are therefore sampled while the reset phases are activated.

Process block 492 shows that the reset phases in the first and second pixels are then deactivated to generate first and second image data signals with first and second pixels of a pixel array on an integrated circuit chip. It is noted that the first and second image data signals also contain noise information, which will be detected and analyzed with the image sensor pixel noise measurement circuit in accordance with the teachings of the present invention.

Process block 494 shows that the reset phases in the first, second, and third operational amplifiers are then deactivated separately and sequentially to generate an amplified differential noise signal in response to the first and second image data signals from the first and second pixels with a noise amplification circuit on the integrated circuit chip.

Process block 496 shows that the amplified differential noise signal output by the noise amplification circuit is then transformed from a time domain to a frequency domain with a fast Fourier transform (FFT) analysis circuit on the integrated circuit chip to analyze a pixel noise characteristic of the pixel array in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensor pixel noise measurement circuit, comprising:
   a pixel array on an integrated circuit chip, wherein the pixel array includes a plurality of pixels including a first pixel and a second pixel, the first pixel is coupled to output a first image data signal and the second pixel is coupled to output a second image data signal;
   a noise amplification circuit on the integrated circuit chip coupled to receive the first and second image data signals from the pixel array, wherein the noise amplification circuit is coupled to output an amplified differential noise signal in response to the first and second image data signals received from the pixel array, wherein the noise amplification circuit is a multistage differential amplification circuit, wherein the multistage differential amplification circuit comprises a plurality of operational amplifiers cascaded in series to generate the amplified differential noise signal; and
   a fast Fourier transform (FFT) analysis circuit on the integrated circuit chip coupled to transform the amplified differential noise signal output by the noise amplification circuit from a time domain to a frequency domain to analyze a pixel noise characteristic of the pixel array.

2. The image sensor pixel noise measurement circuit of claim 1, further comprising a noise output circuit on the integrated circuit chip coupled between the noise amplification circuit and the FFT analysis circuit, wherein the noise output circuit is coupled to receive the amplified differential noise signal from the noise amplification circuit to output a single-ended amplified noise signal to the FFT analysis circuit.

3. The image sensor pixel noise measurement circuit of claim 1, further comprising:
   a first AC coupling between the first pixel and the noise amplification circuit, wherein the first image data signal is output from the first pixel to the noise amplification circuit through the first AC coupling; and
   a second AC coupling between the second pixel and the noise amplification circuit, wherein the second image data signal is output from the second pixel to the noise amplification circuit through the second AC coupling.

4. The image sensor pixel noise measurement circuit of claim 1, wherein the first and second pixels are adjacent pixels in the pixel array.

5. The image sensor pixel noise measurement circuit of claim 1, wherein each one of the plurality of operational amplifiers are coupled to be in a respective reset opamp phase when the first and second pixels are coupled to be in a reset pixel phase, and wherein respective reset opamp phases of each one of the plurality of operational amplifiers are coupled to be separately and sequentially deactivated after respective reset pixel phases of the first and second pixels are deactivated.

6. The image sensor pixel noise measurement circuit of claim 1, wherein the noise amplification circuit comprises:

a first operational amplifier including a first input coupled to receive the first image data signal from the first pixel through a first AC coupling capacitor, wherein the first operational amplifier includes a second input coupled to receive the second image data signal from the second pixel through a second AC coupling capacitor;

a second operational amplifier including a first input coupled to receive a first noise output signal from a first output of the first operational amplifier through a third AC coupling capacitor, wherein the second operational amplifier includes a second input coupled to receive a second noise output signal from a second output of the first operational amplifier through a fourth AC coupling capacitor; and a third operational amplifier including a first input coupled to receive a first noise output signal from a first output of the second operational amplifier through a fifth AC coupling capacitor, wherein the second operational amplifier includes a second input coupled to receive a second noise output signal from a second output of the second operational amplifier through a sixth AC coupling capacitor, wherein the third operational amplifier operational amplifier is coupled to output the amplified differential noise signal, wherein the amplified differential noise signal includes a first noise output signal output from a first output of and a second noise output signal from a second output of the third operational amplifier.

7. The image sensor pixel noise measurement circuit of claim 6, wherein the noise amplification circuit further comprises:

a first reset switch coupled between the first input and the first output of the first operational amplifier;
a first capacitor coupled between the first input and the first output of the first operational amplifier;
a second reset switch coupled between the second input and the second output of the first operational amplifier;
a second capacitor coupled between the second input and the second output of the first operational amplifier;
a third reset switch coupled between the first input and the first output of the second operational amplifier;
a third capacitor coupled between the first input and the first output of the second operational amplifier;
a fourth reset switch coupled between the second input and the second output of the second operational amplifier;
a fourth capacitor coupled between the second input and the second output of the second operational amplifier;
a fifth reset switch coupled between the first input and the first output of the third operational amplifier;
a fifth capacitor coupled between the first input and the first output of the third operational amplifier;
a sixth reset switch coupled between the second input and the second output of third operational amplifier; and
a sixth capacitor coupled between the second input and the second output of the third operational amplifier.

8. The image sensor pixel noise measurement circuit of claim 7, wherein the first and second reset switches are coupled to be switched in response to a first reset signal to activate a reset opamp phase in the first operational amplifier, wherein the third and fourth reset switches are coupled to be switched in response to a second reset signal to activate a reset opamp phase in the a second operational amplifier, and wherein the fifth and sixth reset switches are coupled to be switched in response to a third reset signal to activate a reset opamp phase in the third operational amplifier.

9. The image sensor pixel noise measurement circuit of claim 8, wherein each one of the first, second, and third reset signals is coupled to activate the reset opamp phases in the first, second, and third operational amplifiers contemporaneously with an activated reset opamp phase in the first and second pixels, and wherein each one of the first, second, and third reset signals is coupled to separately and sequentially deactivate the first, second, and third reset opamp phases in the respective first, second, and third operational amplifiers after the reset pixel phase of the first and second pixels is deactivated.

10. The image sensor pixel noise measurement circuit of claim 9, wherein a gain of the noise amplification circuit when the first, second, and third reset opamp phases are deactivated is equal to a product of capacitance values of the first, third, and fifth capacitors divided by a product of capacitance values of the first, third, and fifth AC coupling capacitors.

11. A method of measuring image sensor pixel noise, comprising:

generating first and second image data signals with first and second pixels of a pixel array on an integrated circuit chip;

generating an amplified differential noise signal in response to the first and second image data signals from the first and second pixels with a noise amplification circuit on the integrated circuit chip, wherein the noise amplification circuit is a multistage differential amplification circuit comprising a first, second, and third operational amplifiers cascaded in series to generate the amplified differential noise signal;

activating contemporaneously reset pixel phases in the first and second pixels and reset opamp phases in the first, second and third operational amplifiers;

sampling outputs of the first and second operational amplifiers while the reset pixel phases and reset opamp are activated;

deactivating the reset pixel phases in the first and second pixels to begin generating the first and second first and second image data signals;

deactivating separately and sequentially the reset opamp phases in the first, second, and third operational amplifiers; and transforming the amplified differential noise signal output by the noise amplification circuit from a time domain to a frequency domain with a fast Fourier transform (FFT) analysis circuit on the integrated circuit chip to analyze a pixel noise characteristic of the pixel array.

12. The method of measuring image sensor pixel noise of claim 11, further comprising converting with a noise output circuit on the integrated circuit chip the amplified differential noise signal from the noise amplification circuit to a single-ended amplified noise signal coupled to be received by the FFT analysis circuit.

13. The method of measuring image sensor pixel noise of claim 11, wherein the first and second pixels are adjacent pixels in the pixel array.

14. The method of measuring image sensor pixel noise of claim 11, wherein said deactivating separately and sequentially the reset opamp phases in the first, second, and third operational amplifiers comprises including an adjustable timing gap between deactivating each one of the first, second, and third operational amplifiers.

15. The method of measuring image sensor pixel noise of claim 11, further comprising AC coupling the first and second pixels to the noise amplification circuit to remove DC voltages of the first and second image data signals.

* * * * *